United States Patent
Kikuchi (10) Patent No.: US 12,485,754 B2
(45) Date of Patent: Dec. 2, 2025

(54) VEHICLE CONTROL DEVICE

(71) Applicant: TOYOTA JIDOSHA KABUSHIKI KAISHA, Toyota (JP)

(72) Inventor: Shin Kikuchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 148 days.

(21) Appl. No.: 18/588,242

(22) Filed: Feb. 27, 2024

(65) Prior Publication Data
US 2024/0424901 A1   Dec. 26, 2024

(30) Foreign Application Priority Data

Jun. 26, 2023   (JP) .................. 2023-104146

(51) Int. Cl.
| | |
|---|---|
| *B60K 35/233* | (2024.01) |
| *B60K 35/28* | (2024.01) |
| *B60W 10/12* | (2012.01) |
| *B60W 10/18* | (2012.01) |
| *B60W 30/182* | (2020.01) |
| *B60W 50/14* | (2020.01) |

(52) U.S. Cl.
CPC ............ *B60K 35/233* (2024.01); *B60K 35/28* (2024.01); *B60W 10/12* (2013.01); *B60W 10/18* (2013.01); *B60W 30/182* (2013.01); *B60W 50/14* (2013.01); *B60K 2360/1868* (2024.01); *B60W 2050/146* (2013.01); *B60W 2552/05* (2020.02); *B60W 2556/10* (2020.02); *B60W 2556/20* (2020.02)

(58) Field of Classification Search
None
See application file for complete search history.

(56) References Cited

U.S. PATENT DOCUMENTS

| | | | |
|---|---|---|---|
| 10,073,596 B2 * | 9/2018 | Joachim | G06F 3/017 |
| 2016/0243940 A1 | 8/2016 | Kawasaki et al. | |
| 2017/0180546 A1 * | 6/2017 | Nagai | B60K 35/10 |
| 2024/0002007 A1 * | 1/2024 | Zhan | B62J 45/42 |

FOREIGN PATENT DOCUMENTS

| | | | |
|---|---|---|---|
| JP | 2006029917 A | * | 2/2006 |
| JP | 2012098873 A | * | 5/2012 |
| JP | 2016-153272 A | | 8/2016 |
| JP | 2017182173 A | * | 10/2017 |

* cited by examiner

*Primary Examiner* — Justin S Lee
(74) *Attorney, Agent, or Firm* — SoraIP, Inc.

(57) ABSTRACT

A vehicle control device includes a traveling environment detection unit and an ECU as a controller. The ECU acquires traveling environment information indicating a traveling environment detected by the traveling environment detection unit. The ECU determines whether a vehicle is in an off-road traveling state where the vehicle travels on a bad road, based on the traveling environment information. When the vehicle is in the off-road traveling state, the ECU determines a traveling assist function that is capable of being applied when the vehicle travels on the bad road. Furthermore, the ECU alters a display manner such that the number of times of operation that is necessary to select the determined traveling assist function is smaller than when the vehicle is not in the off-road traveling state.

5 Claims, 5 Drawing Sheets

| No. | DETERMINATION ELEMENT | RELIABILITY |
|---|---|---|
| 1 | LOW RANGE IS SELECTED FOR TRANSFER | HIGH |
| 2 | REAR DIFFERENTIAL IS LOCKED / FRONT DIFFERENTIAL IS LOCKED | HIGH |
| 3 | OFF-ROAD RELATED FUNCTION OTHER THAN ORIGINAL FUNCTIONS IS ENABLED | HIGH |
| 4 | CENTER DIFFERENTIAL IS LOCKED | MIDDLE |
| 5 | STEEP GRADIENT WITH CERTAIN ANGLE OR MORE (FRONT-REAR) | MIDDLE |
| 6 | GRADIENT WITH CERTAIN ANGLE OR MORE (FRONT-REAR) AND GRADIENT WITH CERTAIN ANGLE OR MORE (RIGHT-LEFT) | MIDDLE |
| 7 | GRADIENT WITH CERTAIN ANGLE OR MORE (FRONT-REAR) AND HEIGHT DIFFERENCE AMONG WHEELS IS CERTAIN LENGTH OR MORE, ROAD SURFACE ROUGHNESS IS GUESSED TO BE LARGE | LOW |
| 8 | LOW-SPEED TRAVELING AT CERTAIN SPEED OR LOWER, SLIP DIFFERENCE AMONG WHEELS IS LARGE, AND HEIGHT DIFFERENCE AMONG WHEELS IS CERTAIN LENGTH OR MORE, ROAD SURFACE ROUGHNESS IS ESTIMATED TO BE LARGE | LOW |
| 9 | OFF-ROAD TRAVELING IS EXPECTED FROM DETECTED ROAD SURFACE CONDITION | LOW |
| 10 | OFF-ROAD TRAVELING IS EXPECTED FROM GNSS INFORMATION | LOW |

VEHICLE CONTROL DEVICE

CROSS-REFERENCE TO RELATED APPLICATION

This application claims priority to Japanese Patent Application No. 2023-104146 filed on Jun. 26, 2023, incorporated herein by reference in its entirety.

BACKGROUND

1. Technical Field

The present disclosure relates to a vehicle control device.

2. Description of Related Art

For example, a vehicle control device disclosed in Japanese Unexamined Patent Application Publication No. 2016-153272 is conventionally known. The vehicle control device in the related art includes a first operation unit for driving mode switching and a second operation unit for off-road mode switching. Further, the vehicle control device in the related art includes a detection unit that detects the position of a transfer device, a setting unit that sets a traveling mode based on the detected position and each input operation to the first operation unit and the second operation unit, and a display control unit that causes a multiple display unit to display the driving mode and the traveling mode.

SUMMARY

In recent years, a traveling assist function to assist a driver at the time of the traveling on a bad road is equipped in vehicles. The operation for the selection of the on-off of the traveling assist function is often performed during the traveling on a bad road such as a steep gradient and a rough road surface. Therefore, such an operability that the selection operation can be surely performed even in a situation where the vehicle is inclined forward, rearward, leftward, or rightward or a situation where the vehicle is vibrated and the body is shaken is demanded. Further, a fast-response for coping with a rapid road surface change during the traveling on the bad road is also demanded.

Meanwhile, in recent years, due to the increase in the function of a vehicle cockpit, the expansion of a connected service, and the like, many functions tend to be concentrated on a device in which a software switch can be set. In this case, arranging a software switch for a traveling assist function having a low use frequency on a high display layer in the device or displaying the software switch in a large display size that facilitates the operation of the software switch influences the use of other functions having higher use frequencies. Accordingly, in many cases, the software switch for the traveling assist function is arranged on a low display layer in the device, or is displayed in a small size. Therefore, the operability and fast-response at the time of the use of the traveling assist function is impaired.

An object of the present disclosure is to provide a vehicle control device that makes it possible to improve the operability and fast-response at the time of the selection operation by the driver.

A vehicle control device in the present disclosure is applied to a vehicle including a differential device capable of distributing a driving force generated by a driving force source to driving wheels and absorbing a difference between respective rotation speeds of the driving wheels, and a braking device capable of generating braking forces for the driving wheels and causing respective magnitudes of the braking forces for the driving wheels to be different from each other. The vehicle control device in the present disclosure includes a traveling environment detection unit and a controller. The traveling environment detection unit detects a traveling environment of the vehicle. The controller controls a display manner of an operation panel on which a traveling assist function is selected, depending on the traveling environment, the traveling assist function allowing actuation states of the driving force source, the braking device, and the differential device to be altered, and alters and controls the actuation states such that the actuation states correspond to the selected traveling assist function. The controller acquires traveling environment information indicating the detected traveling environment. Further, the controller determines whether the vehicle is in an off-road traveling state where the vehicle travels on a bad road, based on the traveling environment information. Further, when the vehicle is in the off-road traveling state, the controller determines the traveling assist function that is capable of being applied when the vehicle travels on the bad road. Furthermore, the controller alters the display manner such that the number of times of operation that is necessary to select the determined traveling assist function is smaller than when the vehicle is not in the off-road traveling state.

With the present disclosure, when the vehicle is in the off-road traveling state, the controller can alter the display manner of the operation panel, such that the number of times of operation for the selection of the determined traveling assist function is reduced. Thereby, at the time of the selection operation of the traveling assist function, the driver can perform the selection operation with sure operability and fast-response.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle control device 10 that is an embodiment of the present disclosure will be described below in detail with reference to the drawings. In addition to the embodiment described below, the present disclosure can be carried out in various forms in which various alterations and improvements are performed based on the knowledge of a person skilled in the art.

Figure 1:
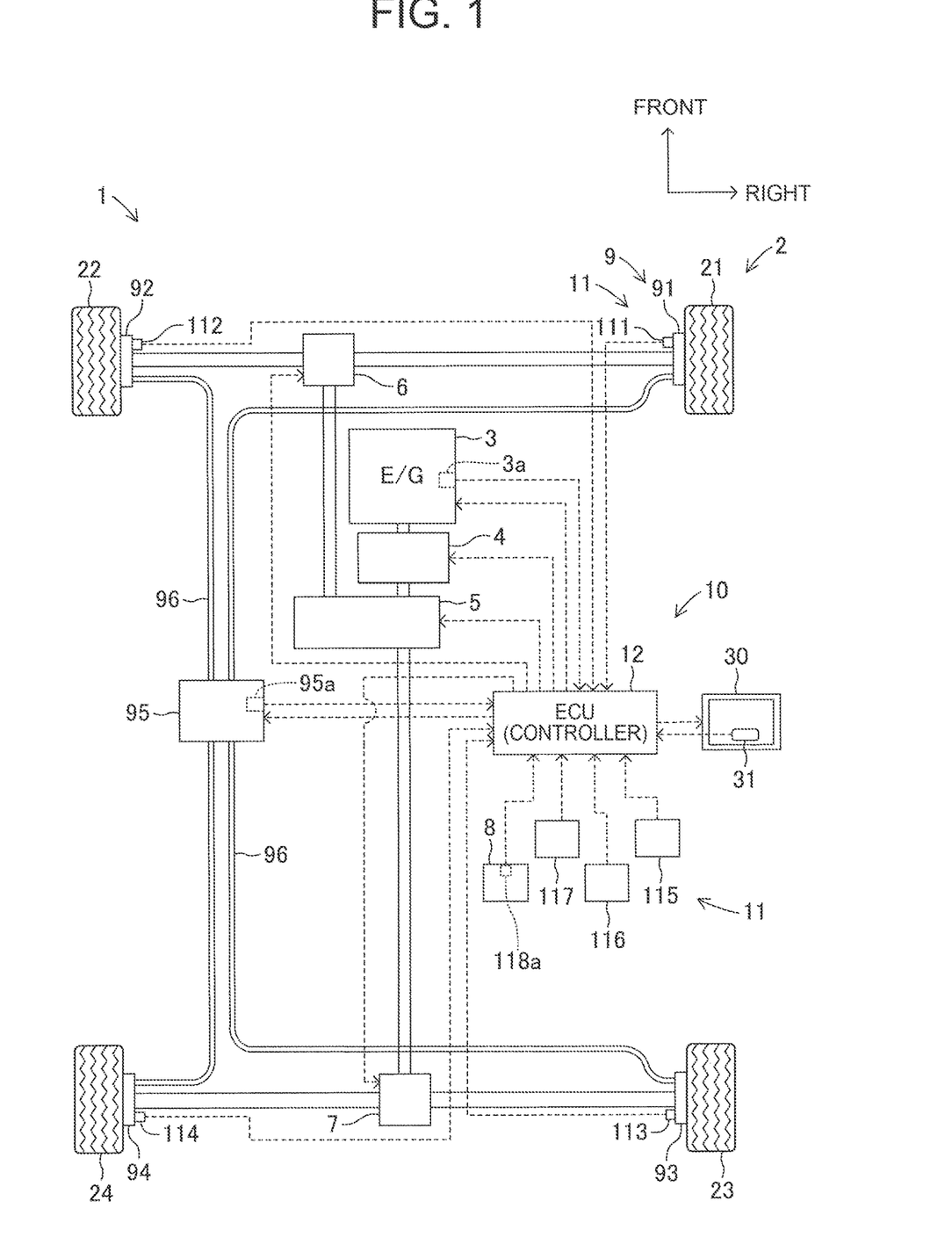
FIG. 1 is a schematic configuration diagram of a vehicle and a vehicle control device in an embodiment.

The vehicle control device 10 is applied to a vehicle 1 shown in FIG. 1. The vehicle 1 includes wheels 2. The wheels 2 are constituted by a right front wheel 21, a left front wheel 22, a right rear wheel 23, and a left rear wheel 24. Further, for transmitting a driving force, specifically, a driving torque, to each of the wheels 2, the vehicle 1 includes an engine 3, a transmission 4, and a center differential 5, a front differential 6, and a rear differential 7 that are differential devices.

The engine 3 is a driving force source of the vehicle 1. The driving torque generated by the engine 3 is transmitted to the transmission 4. An input shaft of the transmission 4 is connected with the engine 3. An output shaft of the transmission 4 is connected with the center differential 5. Thereby, the driving torque is distributed from the output shaft of the transmission 4 to the wheels 2.

Specifically, to the right front wheel 21 and the left front wheel 22, the driving torque is distributed from the transmission 4 through the center differential 5 and the front differential 6. Further, to the right rear wheel 23 and the left rear wheel 24, the driving torque is distributed from the transmission 4 through the center differential 5 and the rear differential 7. That is, the vehicle 1 is a four-wheel-drive vehicle in which the right front wheel 21, the left front wheel 22, the right rear wheel 23, and the left rear wheel 24 can serve as driving wheels.

The vehicle 1 includes a transfer switch 8 that is arranged in a vehicle cabin. Thereby, a driver can perform switching between a "HI range" for the time of normal traveling and a "LOW range" for the time of bad-road traveling. Moreover, in the vehicle 1, for example, the center differential 5 fulfills a transfer function in the "HI range" or "LOW range".

The front differential 6 can absorb the difference between the respective rotation speeds of the right front wheel 21 and the left front wheel 22. The rear differential 7 can absorb the difference between the respective rotation speeds of the right rear wheel 23 and the left rear wheel 24. Moreover, the center differential 5 can absorb the difference between the rotation speeds of the right front wheel 21 and the left front wheel 22 and the rotation speeds of the right rear wheel 23 and the left rear wheel 24.

Furthermore, the vehicle 1 includes a braking device 9 for generating a braking force in each of the wheels 2 that are driving wheels. The braking device 9 includes a right front wheel brake 91, a left front wheel brake 92, a right rear wheel brake 93, a left rear wheel brake 94, a hydraulic oil pressuring device 95, and brake pipes 96.

The hydraulic oil pressuring device 95 is configured to include a reservoir tank that reserves hydraulic oil and a master cylinder that pressures the hydraulic oil. The reservoir tank and the master cylinder are not illustrated. For example, the hydraulic oil pressuring device 95 adjusts pressures (hydraulic oil pressures) of the hydraulic oil that are applied to the respective brake pipes 96, for example, in response to an instruction from a later-described ECU 12, another ECU, or the like. Thereby, the hydraulic oil pressuring device 95 can generate different braking forces from each other, in the right front wheel brake 91, the left front wheel brake 92, the right rear wheel brake 93, and the left rear wheel brake 94.

As shown in FIG. 1, the vehicle control device 10 is equipped in the vehicle 1. The vehicle control device 10 is configured to include a traveling environment detection unit 11 and the ECU 12 as a controller.

The traveling environment detection unit 11 detects the traveling environment of the vehicle 1, and outputs traveling environment information indicating the detected traveling environment to the ECU 12. The traveling environment detection unit 11 is configured to include a wheel speed sensor 111, a wheel speed sensor 112, a wheel speed sensor 113, and a wheel speed sensor 114.

The wheel speed sensor 111 detects a wheel speed that is the rotation speed of the right front wheel 21. The wheel speed sensor 112 detects a wheel speed that is the rotation speed of the left front wheel 22. The wheel speed sensor 113 detects a wheel speed that is the rotation speed of the right rear wheel 23. The wheel speed sensor 114 detects a wheel speed that is the rotation speed of the left rear wheel 24.

Further, the traveling environment detection unit 11 is configured to include an acceleration sensor 115, a current position detection sensor 116, a road surface condition detection sensor 117, and a transfer select sensor 118. The acceleration sensor 115 detects the acceleration of the vehicle 1. The acceleration sensor 115 can detect the accelerations of the vehicle 1 in the upward and downward directions of the vehicle 1, in addition to the accelerations of the vehicle 1 in the forward, rearward, leftward, and rightward directions of the vehicle 1.

The current position detection sensor 116 includes a receiver for a global navigation satellite system (GNSS), for example, and detects the current position of the vehicle 1 based on the received signal. The road surface condition detection sensor 117 includes a stereo camera and a LiDAR, for example, and detects the condition of a road surface in the moving direction of the vehicle 1. The road surface condition detection sensor 117 detects the roughness of the road surface, a roll, a rut, a steep downhill, and the like, as the condition of the road surface. Further, the road surface condition detection sensor 117 can detect that the road surface is a rocky road, a sandy road, a mud road, a deep snow road, a scree road, or the like.

The transfer select sensor 118 detects the operation state of the transfer switch 8. Specifically, the transfer select sensor 118 detects the "HI range" and "LOW range" of the transfer switch 8.

Further, the traveling environment detection unit 11 can include an engine sensor 3a and a brake sensor 95a. The engine sensor 3a includes a throttle valve opening degree sensor, an engine speed sensor, an intake air amount sensor, and the like. The brake sensor 95a is a sensor that detects the hydraulic oil pressure of the master cylinder of the hydraulic oil pressuring device 95, the respective hydraulic oil pressures of the brake pipes 96, and the like.

Furthermore, the traveling environment detection unit 11 can detect the actuation state of an off-road related function other than original functions for the traveling on the bad road by the vehicle 1. Examples of the off-road related function other than the original functions can include a winch function that is separately equipped. For example, in the case where the winch function has been actuated in order that the vehicle 1 escapes from the mud road, the traveling environment detection unit 11 outputs a winch function actuating state to the ECU 12.

The ECU 12 is an electronic control unit including, as a main element, a microcomputer that includes a CPU, a ROM, a RAM, and various interfaces. The CPU sequentially executes a predetermined program, and thereby performs the reading of data, numerical computation, the output of computation results, and the like. The ROM stores programs that are executed by the CPU, a map, and the like. The RAM temporarily stores data and the like. The various interfaces are connected with the traveling environment detection unit 11.

Furthermore, the ECU 12 is connected with a display device 30 as an operation panel. Examples of the display device 30 can include a touch panel display. On an arbitrary display layer of a plurality of display layers, the display device 30 displays a map, an image, a video (multimedia), and the like, and displays a software switch 31 on which a touch operation for selecting a later-described traveling assist function can be performed.

The display device 30 detects the touch operation by a driver or a passenger (referred to as a "user" hereinafter). When the display device 30 detects the contact with a finger of the user, the display device 30 outputs a detection signal indicating the contact position, the contact range, and the like, to the ECU 12. The ECU 12 computes the position of the contact of the finger with the display device 30, the direction of the movement of the finger, the distance of the movement of the finger, the time period of the contact of the finger, and the like, based on information included in the detection signal from the display device 30.

As the operation panel, a display (device) other than the touch panel display can be employed. In this case, the user, particularly, the driver can move a cursor, for example, using a touch pad, a steering switch, or the like that is equipped in the vehicle 1, and can select (click operation or the like) a display button or the like for selecting the displayed traveling assist function.

In the embodiment, the ECU 12 can control the engine 3 and the braking device 9 of the vehicle 1. Specifically, the ECU 12 decides a required driving torque based on the accelerator operation amount, the acceleration, the vehicle speed, and the like. Furthermore, the ECU 12 controls the output power of the engine 3 and the gear ratio of the transmission 4, such that the actual driving torque coincides with the required driving torque.

In principle, the ECU 12 sets the gear ratio depending on the operation state of the transfer switch 8. That is, when the "LOW range" is selected and the vehicle 1 is in an off-road traveling state where the vehicle 1 travels on the bad road, the ECU 12 sets the gear ratio to a higher value than when the "HI range" is selected and the vehicle 1 is in an on-road traveling state where the vehicle 1 travels on a good road (paved road).

Further, the ECU 12 decides a required deceleration based on the brake operation amount, the respective wheel speeds, the acceleration, and the like. Furthermore, the ECU 12 generates the braking force in each of the wheels 2 such that the actual deceleration coincides with the required deceleration. That is, the ECU 12 decides target values (target hydraulic oil pressures) of the hydraulic oil pressures that need to be applied to the brakes of the braking device 9, and furthermore controls the hydraulic oil pressuring device 95 such that the actual hydraulic oil pressures that are applied to the brakes of the braking device 9 coincide with the target hydraulic oil pressures.

Further, in the case of a traveling environment in which the vehicle 1 travels on the bad road, that is, in the case of the off-road traveling state, the ECU 12 executes the traveling assist function that can be applied when the vehicle 1 travels on the bad road. Specifically, the ECU 12 executes the traveling assist function that can be applied, by controlling (altering) the actuation states of the engine 3, the transmission 4, the center differential 5, the front differential 6, the rear differential 7, and the braking device 9. In this case, the ECU 12 executes the traveling assist function that is selected by the user, particularly, the driver, through the operation of the software switch 31 displayed on the display device 30.

Examples of the traveling assist function can include a "downhill assist control (DAC)" in which a constant speed is maintained and stability is secured when the vehicle 1 travels on an off-road steep downhill. Further, examples of the traveling assist function can include a "CRAWL" in which the vehicle 1 travels at a constant speed and both stability and driving characteristic are achieved when the vehicle 1 travels on a rocky road having a large roughness or an off-road steep downhill. Further, examples of the traveling assist function can include a "multi terrain select (MTS)" in which characteristics of the driving force, a traction control, and the like are optimized depending on the road surface and driving characteristic is assured when the vehicle 1 travels on a rocky road, a sandy road, a mud road, a deep snow road, a scree road, or the like. Furthermore, examples of the traveling assist function can include a "turn assist (TA)" in which turn-in ability is enhanced and the number of times of turning operation is reduced when the vehicle 1 travels in a place that is along a zigzag mountain road and in which turning is needed many times.

Specifically, in the case where the "DAC" or the "CRAWL" is executed, the ECU 12 maintains the vehicle 1 at a constant low speed by the cooperation of the engine 3 and the braking device 9. In this case, for example, the ECU 12 puts the center differential 5 and the like into a differential lock state (differential action prohibition state), as necessary, and performs such a control that the vehicle 1 travels while an appropriate driving force and braking force are generated. The alteration of the center differential 5 and the like into the differential lock state can be realized also by user's operation of a differential lock switch provided in the vehicle cabin, for example.

Further, in the case where the "MTS" is executed, the ECU 12 causes the vehicle 1 to travel by the cooperation of the engine 3 and the braking device 9, depending on the condition of the road surface. On this occasion, for example, in the case where the vehicle 1 travels on a sandy road or a mud road, there is a possibility that traveling resistance becomes large and the wheels 2 spin out, and therefore the ECU 12 performs such a control that the frequency of the intervention by the traction control is reduced.

Furthermore, in the case where the "TA" is executed, the ECU 12 causes the vehicle 1 to travel while giving braking forces to the respective wheels 2 through the braking device 9, depending on the form of the road surface, as exemplified by the size of a curve. On this occasion, for example, in the case where the vehicle 1 travels on a tight corner through which the vehicle 1 is hard to pass with no turning, the ECU 12 controls the braking device 9 such that a high braking force is given to the right rear wheel 23 or the left rear wheel 24 on the inside of the turn, for enhancing the turn-in ability of the vehicle 1. The "DAC", the "CRAWL", the "MTS", and the "TA" are well-known functions, and detailed descriptions of them are omitted.

Next, a display manner alteration program that is executed by the ECU 12 will be described. The ECU 12 executes the display manner alteration program shown by a flowchart in FIG. 2.

Figure 2:
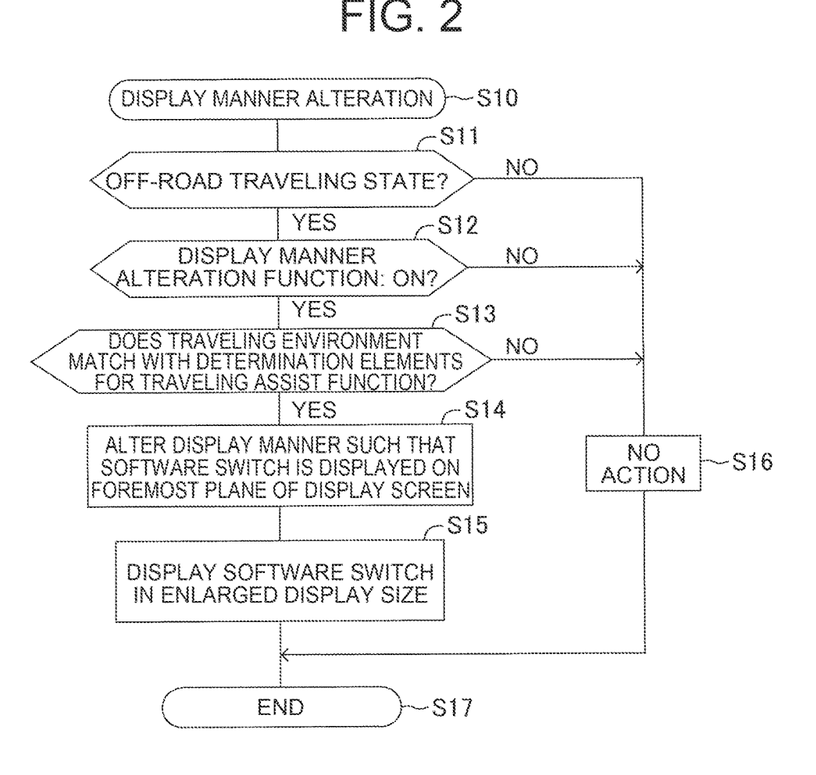
FIG. 2 is a flowchart of a display manner alteration program.

The ECU 12 (more specifically, the CPU of the microcomputer constituting the ECU 12) starts the execution of the display manner alteration program in step S10. Subsequently, in step S11, the ECU 12 determines whether the vehicle 1 is in the off-road traveling state, based on the traveling environment information acquired from the traveling environment detection unit 11. For example, in the case where the transfer switch 8 has been operated to the "LOW range", the ECU 12 determines (estimates) that there is a high possibility that the vehicle 1 is in the off-road traveling state where the vehicle 1 travels on the bad road, and executes the process of step S12.

On the other hand, in the case where the vehicle 1 is not in the off-road traveling state, the ECU 12 makes the determination of "No", and does not alter the display manner of the software switch 31 in step S16. Then, the ECU 12 ends the execution of the program once in step S17.

Subsequently, in step S12, the ECU 12 determines whether a display manner alteration function is "ON", that is, whether an instruction of the alteration of the display manner of the software switch 31 in the off-road traveling state has been given. Then, in the case where the display manner alteration function is "ON", the ECU 12 makes the determination of "Yes", and executes the process of step S13. For example, the display manner alteration function is set to "ON" as the default, and can be altered to "OFF" by user's touch operation of the display device 30.

On the other hand, in the case where the display manner alteration function is not "ON", that is, in the case where the display manner alteration function has been set to "OFF", the ECU 12 makes the determination of "No", and does not alter the display manner of the software switch 31 in step S16. Then, the ECU 12 ends the execution of the program once in step S17.

Figure 3:
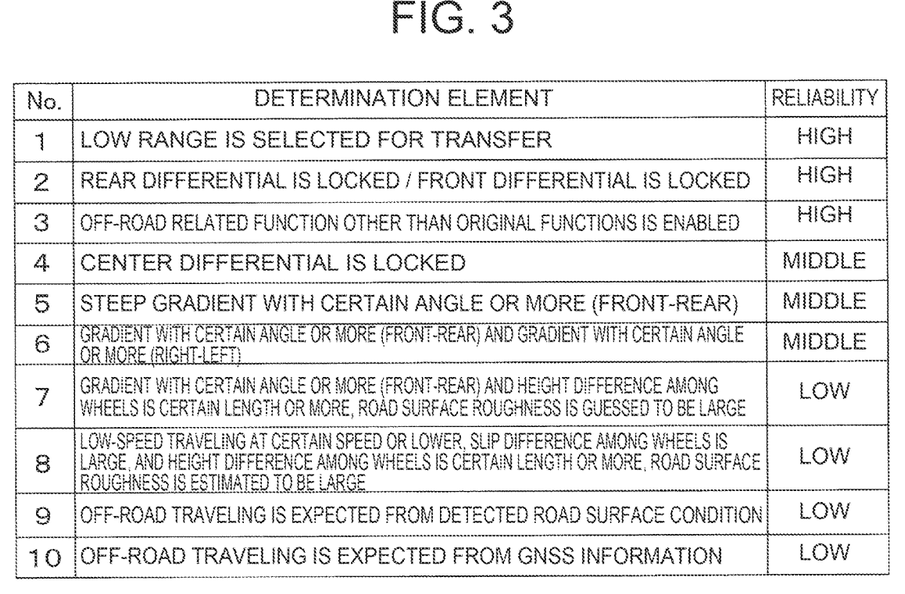
FIG. 3 is a table showing determination elements for a traveling assist function.

In step S13, the ECU 12 compares the traveling environment indicated by the traveling environment information acquired in step S11, with a plurality of determination elements for determining the traveling assist function shown in FIG. 3. Then, the ECU 12 determines whether the current traveling environment of the vehicle 1 matches with the determination elements, that is, whether the traveling assist function that can be applied when the vehicle 1 travels on the bad road shown by the traveling environment is satisfied. Specifically, the ECU 12 determines whether the traveling environment matches with the respective determination elements of No. 1 to No. 10 shown in FIG. 3. Then, for example, in the case where the traveling environment matches with a plurality of determination elements of the 10 determination elements, the ECU 12 makes the determination of "Yes", and executes the process of step S14.

On the other hand, in the case where the current traveling environment of the vehicle 1 does not match as a result of the comparison between the traveling environment information and the plurality of determination elements, the traveling assist function is unnecessary although the determination (estimation) of the off-road traveling state is made in step S11. Therefore, the ECU 12 makes the determination of "No" in step S13, and does not alter the display manner of the software switch 31 in step S16. Then, the ECU 12 ends the execution of the program once in step S17, and starts the execution of the program again in step S10, after the elapse of a predetermined short time period.

In step S14, the ECU 12 alters the display manner of the software switch 31 for selecting the traveling assist function that is determined to be capable of being applied. Specifically, the ECU 12 alters the display manner such that the software switch 31 is displayed on an after-alteration display layer that is the highest display layer of the display device 30, that is, such that the foremost plane (top screen) is adopted as the layer level. The comparison with a case where the display manner is not altered will be described below.

Figure 4:
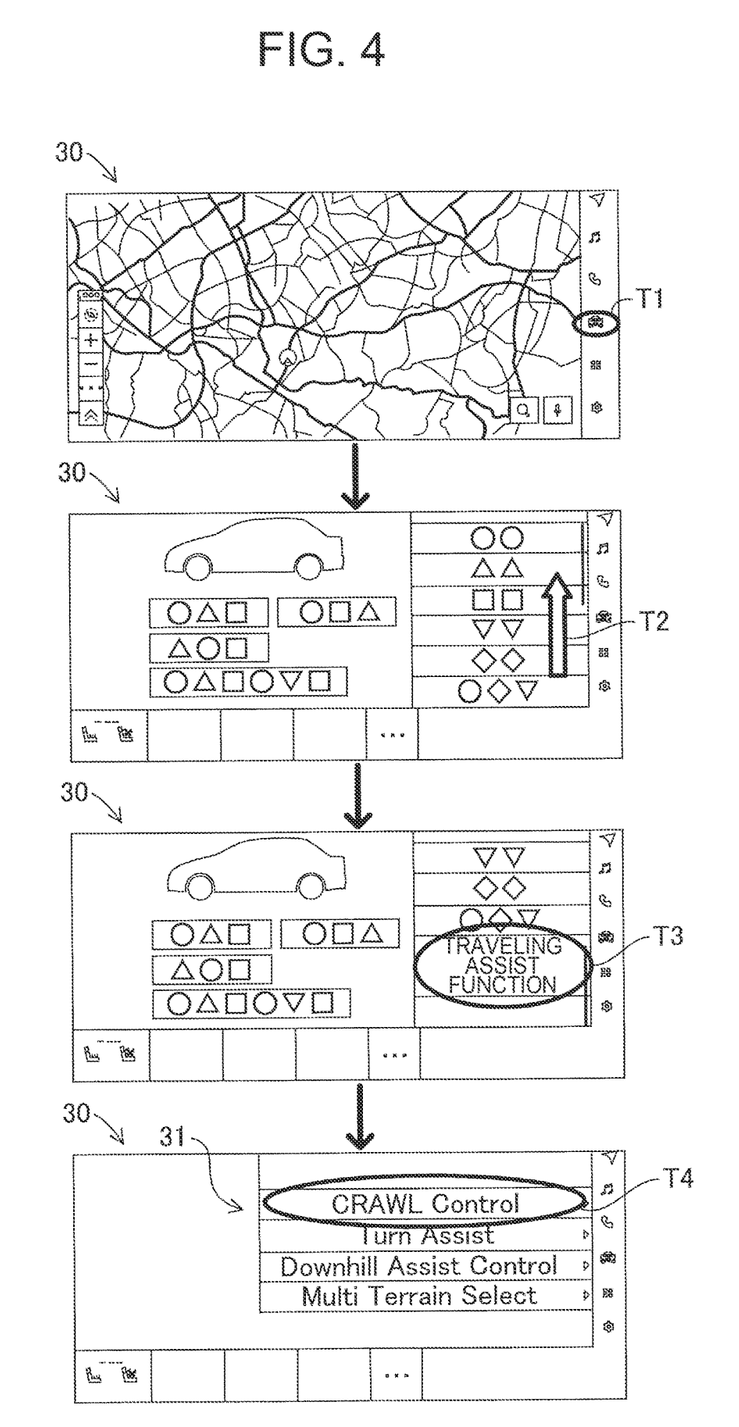
FIG. 4 is a diagram for describing the display and operation of a software switch before the alteration of a display manner.

In the case where the ECU 12 does not alter the layer level as the display manner of the software switch 31, the software switch 31 is displayed on a low display layer (third display layer) as the layer level, as shown in a screen transition of the display device 30 in FIG. 4. In this case, first, the driver performs a first operation T1 of touching an operation icon displayed on the foremost plane (top screen) of the display device 30.

By performing the first operation T1, in accordance with a downward arrow shown by a thick solid line arrow in FIG. 4, the screen transitions to a second display layer at a lower layer level than the foremost plane, and a setting menu list is displayed so as to be capable of being scrolled, on the right side of the screen. Generally, the use frequency of the traveling assist function in the off-road traveling state is low. Therefore, the driver performs a second operation T2 of moving (swiping) the finger upward at a vicinity of the setting menu list.

Then, the driver performs a third operation T3 of touching "traveling assist function" displayed by the scrolling. Thereby, the screen transitions to a third display layer at a lower layer level than the second display layer, and a function list for "traveling assist function" is displayed on the right side of the screen. Accordingly, the driver performs a fourth operation T4 of touching, for example, "CRAWL" of the displayed function list. That is, in the embodiment, in the case where the ECU 12 does not alter the display manner, the software switch 31 is displayed on the third display layer as a before-alteration display layer.

In this way, in the case where the ECU 12 does not alter the display manner, the driver needs to perform the four selection operations for the transition from the foremost plane of the display device 30 to the lower third display layer. In the case where the number of times of operation is large, particularly, in a situation where the driver is shaken in the off-road traveling state, there is a high possibility that the number of times of erroneous touch operation (erroneous selection operation) increases. As a result, the number of times of operation that is necessary until the driver selects the traveling assist function further increases.

Figure 5:
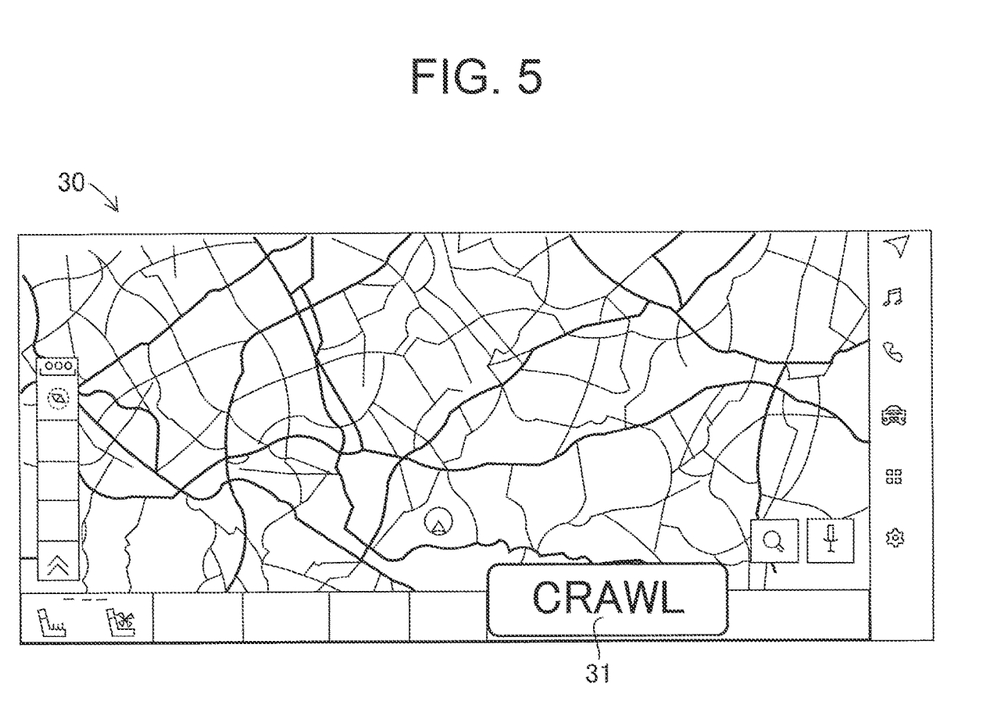
FIG. 5 is a diagram for describing the display and operation of a software switch after the alteration of the display manner.

In contrast, in the case where the display manner of the software switch 31 is altered, the ECU 12 alters the display manner such that the software switch 31 for selecting the determined traveling assist function is displayed on the foremost plane that is the after-alteration display layer, as shown in FIG. 5. Thereby, the driver only needs to perform one touch operation of the software switch 31 displayed on the foremost plane, without performing the transition of the display layer of the display device 30.

Further, the ECU 12 alters the display manner such that the software switch 31 is arranged and displayed at a lower portion of the display screen of the display device 30, as shown in FIG. 5. Thereby, for example, the hand and finger of the driver can be stabilized by a frame member (not illustrated) that holds the display screen of the display device 30 and a support member (an unillustrated dash panel or the like) that supports the display device 30. By altering the display manner such that the software switch 31 is arranged at the optimal position in this way, when the driver performs the touch operation of the software switch 31, the number of times of erroneous touch operation can be reduced. Then, after the ECU 12 alters the display manner such that the software switch 31 is displayed on the after-alteration display layer as the foremost plane of the display device 30, the ECU 12 proceeds to step S15 shown in FIG. 2.

In step S15, the ECU 12 alters the display manner such that the display size of the software switch 31 displayed on the foremost plane is enlarged. That is, the ECU 12 displays the software switch 31 such that the display size of the software switch 31 is enlarged, as shown in FIG. 5. In this case, the ECU 12 displays the software switch 31 such that the display size of the software switch 31 is larger than the display size in the function list shown in FIG. 4.

Thereby, the driver can easily perform the touch operation of the largely displayed software switch 31. Accordingly, when the driver performs the touch operation, the number of times of erroneous touch operation can be reduced. Then, after the ECU 12 alters the display manner such that the software switch 31 is displayed in the enlarged display size, the ECU 12 proceeds to step S17.

In step S17, the ECU 12 ends the execution of the program once. Then, the ECU 17 starts the execution of the program again in step S10, after the elapse of the predetermined short time period. In the embodiment, the case where both step processes of step S14 and step S15 are executed has been exemplified. However, only one step process of step S14 and step S15 may be executed.

As understood from the above description, the vehicle control device 10 is applied to the vehicle 1 including the center differential 5, the front differential 6, and the rear differential 7 that can distribute the driving force generated by the engine 3 to the wheels 2 as the driving wheels, and that can absorb differences among the respective rotation speeds of the wheels 2, and the braking device 9 that can generate the braking force for the wheels 2 and that can cause the respective magnitudes of the braking forces for the driving wheels 2 to be different from each other. The vehicle control device 10 includes the traveling environment detection unit 11 and the ECU 12 that is the controller. The traveling environment detection unit 11 detects the traveling environment of the vehicle 1. The ECU 12 controls the display manner of the display device 30 that is the operation panel on which the traveling assist function allowing the actuation states of the engine 3, the braking device 9, the center differential 5, the front differential 6, and the rear differential 7 to be altered is selected, depending on the traveling environment, and alters and controls the actuation states such that the actuation states correspond to the selected traveling assist function. Moreover, the ECU 12 acquires the traveling environment information indicating the detected traveling environment. Further, the ECU 12 determines (estimates) whether the vehicle 1 is in the off-road traveling state where the vehicle 1 travels on the bad road, based on the traveling environment information. Further, when the vehicle 1 is in the off-road traveling state, the ECU 12 determines the traveling assist function that can be applied when the vehicle 1 travels on the bad road. Furthermore, the ECU 12 alters the display manner such that the number of times of operation that is necessary to select the determined traveling assist function is smaller than when the vehicle 1 is not in the off-road traveling state.

In this embodiment, when the vehicle 1 is in the off-road traveling state, the ECU 12 can alter the display manner of the display device 30, such that the number of times of operation for the selection of the determined traveling assist function is reduced. Thereby, although the display manner when the vehicle 1 is not in the off-road traveling state makes it hard to perform the selection with suitable operability and fast-response, the display manner is altered such that the number of times of operation is reduced, when the driver selects the traveling assist function in the off-road traveling state. Accordingly, at the time of the selection operation of the traveling assist function, the driver can perform the selection operation with sure operability and fast-response.

Next, a first modification will be described. In the first modification, when it is predicted that the software switch 31 will be selected by the driver, the ECU 12 alters the display manner such that the software switch 31 can be selected. Therefore, the ECU 12 compares the traveling environment information with the determination elements for specifying the traveling assist function, and displays the software switch 31 for selecting the traveling assist function desired by the user, on the foremost plane, at an appropriate timing.

In the off-road traveling state, for determination elements for appropriately determining a situation where the user selects the "DAC", the determination elements of No. 2 and No. 8 are excluded from the determination elements shown in FIG. 3. Further, as determination elements for appropriately determining the situation where the user selects the "DAC" as the traveling assist function, "the vehicle cannot climb and moves rearward on the road surface of an off-road steep gradient" is newly added with a reliability of "high", and the reliability in No. 5 shown in FIG. 3 is altered to "high".

Thereby, in the determination process of step S13 in the program shown in FIG. 2, the ECU 12 compares the traveling environment information with the determination elements for determining the "DAC", and determines whether the traveling environment information matches with the determination elements. Then, in the case where the ECU 12 determines that the traveling environment information matches with the determination elements, the ECU 12 enlarges and displays the software switch 31 for selecting the "DAC", on the foremost plane of the display device 30, in step S14 and step S15, similarly to the "CRAWL" in FIG. 5.

In the off-road traveling state, as determination elements for appropriately determining a situation where the user selects the "MTS", "the traveling resistance is large and it is guessed that the vehicle travels on a sandy road" is newly added to the determination elements shown in FIG. 3, with a reliability of "middle". Furthermore, "the vehicle travels while the air pressures of the four wheels are decreased" is newly added to the above-described determination elements shown in FIG. 3, with a reliability of "middle".

Thereby, in the determination process of step S13 in the program shown in FIG. 2, the ECU 12 compares the traveling environment information with the determination elements for determining the "MTS", and determines whether the traveling environment information matches with the determination elements. Then, in the case where the ECU 12 determines that the traveling environment information matches with the determination elements, the ECU 12 enlarges and displays the software switch 31 for selecting the "MTS", on the foremost plane of the display device 30, in step S14 and step S15, similarly to the "CRAWL" in FIG. 5.

In the off-road traveling state, for determination elements for appropriately determining a situation where the user selects the "TA", the determination elements of No. 2 to No. 8 are excluded from the determination elements shown in FIG. 3. Further, as determination elements for appropriately determining the situation where the user selects the "TA" as the traveling assist function, "turning with a large steering angle is repeated at a low speed" is newly added with a reliability of "high".

Thereby, in the determination process of step S13 in the program shown in FIG. 2, the ECU 12 compares the traveling environment information with the determination elements for determining the "TA", and determines whether the traveling environment information matches with the determination elements. Then, in the case where the ECU 12 determines that the traveling environment information matches with the determination elements, the ECU 12 enlarges and displays the software switch 31 for selecting the "TA", on the foremost plane of the display device 30, in step S14 and step S15, similarly to the "CRAWL" in FIG. 5. Accordingly, in the first modification, in addition to the same effect as the effect in the above embodiment, it is possible to perform the presentation to the driver at an appropriate timing.

Next, a second modification will be described. In the second embodiment, the ECU 12 can alter the display manner of the software switch 31, based on the reliability of determination accuracy that is previously given to each of the above-described determination elements shown in FIG. 3. Although the second modification will be described below, detailed descriptions about substantially the same parts as those of the display manner alteration program in the above embodiment will be omitted.

Figure 6:
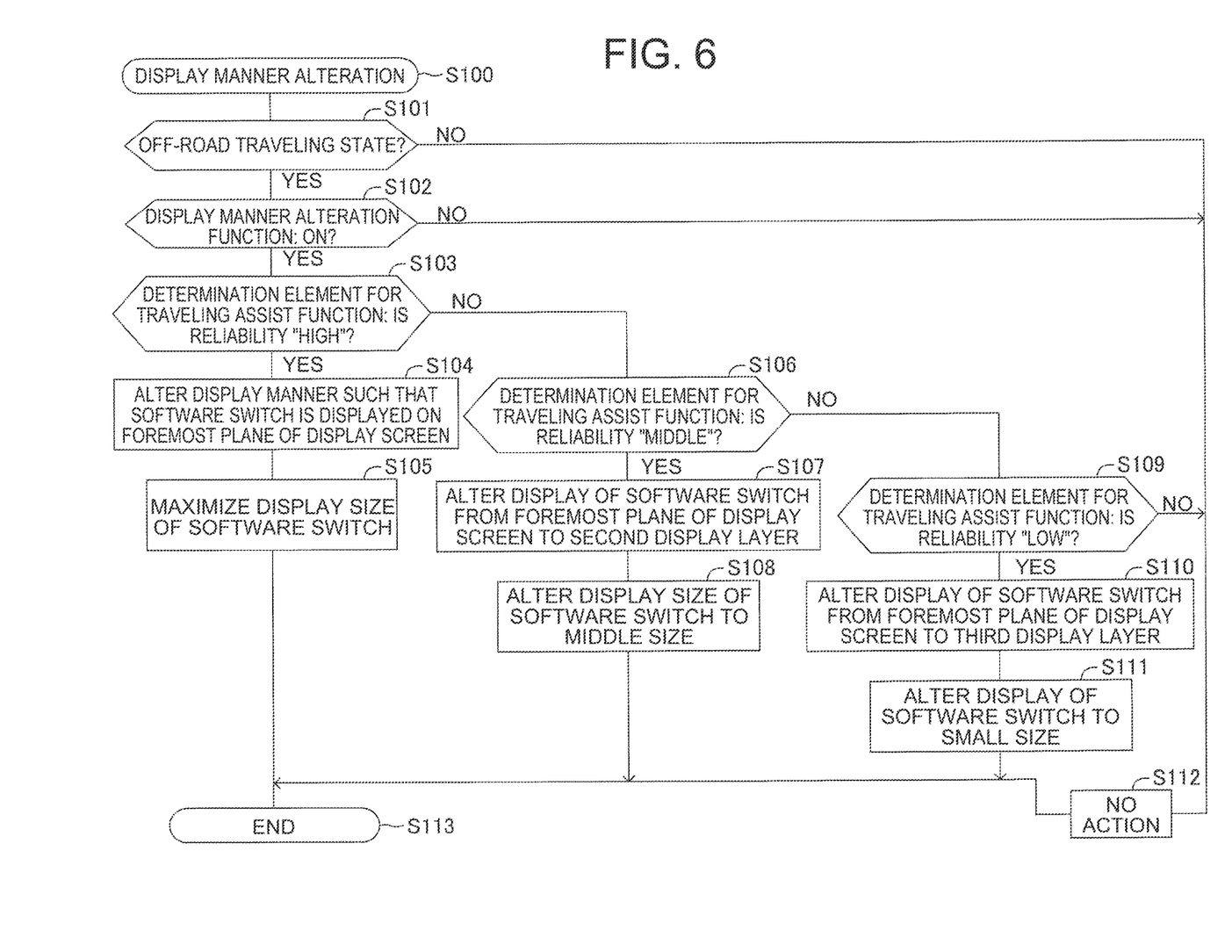
FIG. 6 is a flowchart of a display manner alteration program according to a second modification.

In the second modification, the ECU 12 executes a display manner alteration program shown in FIG. 6. The program in the second modification alters the display manner depending on the reliability of the determination accuracy that is previously given to each of the determination elements. Therefore, parts corresponding to step S13, step S14, and step S15 of the program in the above embodiment are altered.

Specifically, as shown in FIG. 6, in step S100, the execution of the display manner alteration program is started, and in step S101, the ECU 12 determines whether the vehicle 1 is in the off-road traveling state. Then, in the case where the display manner alteration function is "ON" in the subsequent step S102, the ECU 12 makes the determination of "Yes", and executes step S103 and subsequent step processes.

In step S103, the ECU 12 compares the determination elements and the traveling environment information, and determines whether the reliability of the matching determination element is "high". That is, for example, when the front differential 6 and the rear differential 7 are in the differential lock state, the ECU 12 determines that the traveling environment information matches with the No. 2 determination element in FIG. 3 for which the reliability is "high". Thereby, the ECU 12 makes the determination of "Yes" in step S103, alters the layer level of the after-alteration display layer of the software switch 31 to the foremost plane in step S104, and maximizes the display size of the software switch 31 in step S105. Then, in step S113, the ECU 12 ends the execution of the program once.

On the other hand, when the reliability of the matching determination element is not "high" in step S103, the ECU 12 makes the determination of "No", and executes the process of step S106. In step S106, the ECU 12 compares the determination elements and the traveling environment information, and determines whether the reliability of the matching determination element is "middle". That is, for example, when the center differential 5 is in the differential lock state, the ECU 12 determines that the traveling environment information matches with the No. 4 determination element in FIG. 3 for which the reliability is "middle". Thereby, the ECU 12 makes the determination of "Yes" in step S106, alters the layer level of the after-alteration display layer of the software switch 31 to the second display layer in step S107, and alters the display size of the software switch 31 to a middle size that is smaller than the maximal size, in step S108. Then, in step S113, the ECU 12 ends the execution of the program once.

On the other hand, when the reliability of the matching determination element is not "middle" in step S106, the ECU 12 makes the determination of "No", and executes the process of step S109. In step S109, the ECU 12 compares the determination elements and the traveling environment information, and determines whether the reliability of the matching determination element is "low". That is, for example, when the off-road traveling is expected based on the road surface condition detected by the road surface condition detection sensor 117, the ECU 12 determines that the traveling environment information matches with the No. 9 determination element in FIG. 3 for which the reliability is "low".

Accordingly, the ECU 12 makes the determination of "Yes" in step S109, alters the layer level of the after-alteration display layer of the software switch 31 to the third display layer in step S110, and alters the display size of the software switch 31 to a small size that is smaller than the middle size, in step S111. Then, in step S113, the ECU 12 ends the execution of the program once. In the case where the reliability is "low", the probability that the vehicle 1 is in the off-road traveling state is low. Accordingly, there is a high possibility that the traveling assist function is not selected, and therefore, in the second modification, the ECU 12 displays the software switch 31 on the third display layer, as in the case where the vehicle 1 is not in the off-road traveling state.

On the other hand, when the reliability of the matching determination element is not "low" in step S109, the ECU 12 makes the determination of "No". Then, the ECU 12 does not alter the display manner of the software switch 31 in step S112, and ends the execution of the program once in step S113. Accordingly, also in the second modification, the same effect as the effect in the above embodiment is obtained.

What is claimed is:

1. A vehicle control device that is applied to a vehicle including a differential device capable of distributing a driving force generated by a driving force source to driving wheels and absorbing a difference between respective rotation speeds of the driving wheels, and
   a braking device capable of generating braking forces for the driving wheels and causing respective magnitudes of the braking forces for the driving wheels to be different from each other,
   the vehicle control device comprising:
   a traveling environment detection unit configured to detect a traveling environment of the vehicle; and
   a controller configured to control a display manner of an operation panel on which a traveling assist function is selected, depending on the traveling environment, the traveling assist function allowing actuation states of the driving force source, the braking device, and the differential device to be altered, and configured to alter and control the actuation states such that the actuation states correspond to the selected traveling assist function, wherein
   the controller acquires traveling environment information indicating the detected traveling environment,
   the controller determines whether the vehicle is in an off-road traveling state where the vehicle travels on a bad road, based on the traveling environment information, and
   when the vehicle is in the off-road traveling state, the controller determines the traveling assist function that is capable of being applied when the vehicle travels on the bad road, and alters the display manner such that the number of times of operation that is necessary to select the determined traveling assist function is smaller than when the vehicle is not in the off-road traveling state.

2. The vehicle control device according to claim 1, wherein:

The operation panel displays a software switch through which the traveling assist function is selected, in an arbitrary display size, on an arbitrary display layer of a plurality of display layers; and the controller alters the display manner to at least one of a display manner in which the software switch is displayed on an after-alteration display layer having a higher layer level than a before-alteration display layer and a display manner in which the software switch is displayed such that the display size is larger than a size when the vehicle is not in the off-road traveling state, the after-alteration display layer and the before-alteration display layer being included in the plurality of display layers, the before-alteration display layer being a display layer on which the software is displayed when the vehicle is not in the off-road traveling state.

3. The vehicle control device according to claim 2, wherein the controller alters the layer level of the after-alteration display layer depending on a reliability of determination accuracy, such that the layer level of the after-alteration display layer is higher as the reliability is higher, the reliability being previously given to a determination element relevant to the determination of the traveling assist function.

4. The vehicle control device according to claim 1, wherein the controller alters the display manner, when the controller predicts that the determined traveling assist function will be selected.

5. The vehicle control device according to claim 1, wherein the controller alters the display manner, in a case where the vehicle is in the off-road traveling state and where an instruction of the alteration of the display manner is previously given.

* * * * *